Aug. 5, 1958    V. C. DAVIS ET AL    2,846,590
NITROGEN RECORDER

Filed March 16, 1956    3 Sheets-Sheet 1

INVENTORS
VINCENT C. DAVIS
MILTON A. AUSMAN
BY
ATTORNEYS

INVENTORS
VINCENT C. DAVIS
MILTON A. AUSMAN
ATTORNEYS

United States Patent Office 2,846,590
Patented Aug. 5, 1958

2,846,590

NITROGEN RECORDER

Vincent C. Davis, Oakland, and Milton A. Ausman, Richmond, Calif., assignors to California Research Corporation, San Francisco, Calif., a corporation of Delaware Application March 16, 1956, Serial No. 572,060

11 Claims. (Cl. 250—204)

This invention relates to analysis of fluids, and particularly to continuous analysis of flowing fluid streams by continuous titration in a titration zone, and by continuous photometric analysis of the mixture in said titration zone to obtain a continuing and highly accurate determination of the concentration of a given substance in the titrate liquid being supplied to said titration zone; and an object of the invention is to provide novel continuous titration methods and apparatus that will automatically detect deviations of said mixture from a predetermined degree of neutralization, and that will automatically change the proportions of said mixture as necessary to restore said mixture to said predetermined degree of neutralization.

It is desirable in many chemical processes frequently to determine the concentration of a particular substance in a fluid, and particularly a flowing liquid stream, in order that measures may be taken to maintain such concentration within desired ranges. Such determinations may be made manually, for example, by frequent periodic manual titration of selected samples. Such manual determinations, however, are subject to human error, are wasteful of the time of personnel, and involve undesirable and often dangerous time lags between analysis and corrective action. It is therefore an object of this invention to provide novel automatic titration apparatus for continuous titration analysis of a liquid for determining the concentration therein of a particular substance, and for providing a continuous record of said concentration.

Various automatic and continuous titrimeters have been proposed, in which various detector systems have been proposed for determining titration end points and deviations therefrom, including (a) high frequency systems, (b) electrometric or potentiometric systems, and (c) photometric systems. With respect to (a), the equivalence point in various titrations, for example, in the titration of basic nitrogen compounds with perchloric acid, can readily be detected with electrical oscillations operating at high frequencies above several megacycles. Systems of this type have the important advantage of not requiring electrodes or any other direct contact with the titration liquids. However, a serious disadvantage of such systems is their nonspecificity. For example, such systems respond to various quantities of moisture and to traces of many types of polar compounds. With respect to (b), a glass indicator electrode and a calomel or silver sulfide reference electrode may be used as an electrode combination for various titrations. However, such systems have various disadvantages. For example, such systems often must be calibrated to compensate for various asymmetry potentials, temperature differentials and other variables. Further, such systems often are strongly affected by stray currents and electrostatic fields, which must be compensated for by shielding. Still further, the resistance of the titrate-reagent solution is often too high for satisfactory measurement of electrode potentials. With respect to (c), an indicator that undergoes chromatic changes in response to changing titration conditions, for example, methyl violet in the titration of basic nitrogen compounds with perchloric acid, provides a very useful and simple method of determining the end point of titrations. The chromatic change at the end point is sharp and conforms to the theoretical and potentiometric equivalence point. Use of such an indicator eliminates many of the disadvantages of high frequency and electrometric detector systems. However, thus far, the color changes of such an indicator have had to be observed, and thus far no apparatus has been developed to adequately substitute for human observation in following these color changes. Therefore, continuous titration apparatus utilizing a chromatically changeable indicator, for example, methyl violet, thus far has necessitated constant personnel attendance and reliance on the human element.

With the foregoing in mind, it is an object of this invention to provide continuous titration apparatus incorporating automatic means for following the chromatic changes that take place with use of a chromatically changeable indicator, and further incorporating automatic means responsive to said chromatic changes to vary the proportions of the titrate liquid and the reagent liquid in the titration zone.

In accordance with this invention there is provided apparatus comprising means for mixing in a titration or mixing zone a titration reagent, a liquid containing a substance in a concentration that is to be continuously determined, and a chromatically changeable indicator, for example, methyl violet, means for passing a beam of radiation responsive to chemical changes in said indicator into and out of the mixture in said mixing zone, means for passing into the cathode of a first photomultiplier tube substantially all components of said beam having wave lengths lying within a first predetermined wave length band, means for passing into the cathode of a second photomultiplier tube substantially all components of said beam having wave lengths lying within a second and separate predetermined wave length band, means for balancing said photomultiplier tubes so that their output signals are equal in amplitude when said substance has been neutralized to a given degree by said reagent, for example, sufficiently so that said mixture is at the titration end point, and means for utilizing the difference in amplitude of said signals caused by chemical changes in said indicator, as a result of changes in the proportions between said substance and said reagent to change the proportions of said mixture to restore the given degree of neutralization. For convenience, the operation of the invention will be described herein in terms of the titration end point and deviations therefrom, although those skilled in the art will be able to perceive that mixture conditions other than end point conditions may be used as an operating basis.

The principles of this invention have applications in the continuous automatic titration of a variety of liquids and substances, in addition to those disclosed herein. Modifications of the procedures and apparatus disclosed herein that may be necessary for such applications will occur to those skilled in the art after they are familiar with the application of the invention to titration involving one particular combination of a titration reagent and a liquid containing a substance in a concentration that is to be determined. Therefore, for simplicity the invention will be hereinafter described with particular reference to continuous automatic titration of a flowing hydrocarbon stream for basic nitrogen content, using as a reagent perchloric acid dissolved in glacial acetic acid, and using methyl violet as an indicator. Other determinations to which this invention are applicable include: mercaptans and $H_2S$ in hydrocarbons, chlorides in water, phenol in phenol still overheads, and peroxides in phenol plant mixtures.

Nitrogen compounds are known to be poisonous to reformer catalysts used in certain hydrocarbon conversion processes. Therefore, a careful control of certain blending and pretreating operations requires considerable information on the nitrogen content of reformer hydrocarbon feed stocks. In two-stage catalytic reforming units in particular, nearly all of the nitrogen content of the stocks being charged to the reforming stage thereof is basic in character. Hence, a knowledge of the basic nitrogen content of such charging stocks is usually adequate for use in maintaining nitrogen toxicity to those stocks within acceptable limits. This is fortuitous because an analysis of the charging stocks for basic nitrogen content more conveniently may be made than an analysis for total nitrogen content.

The invention will be better understood, and further objects and advantages thereof will be apparent, from the following description when considered in connection with the appended drawings, in which.

Figure 1:
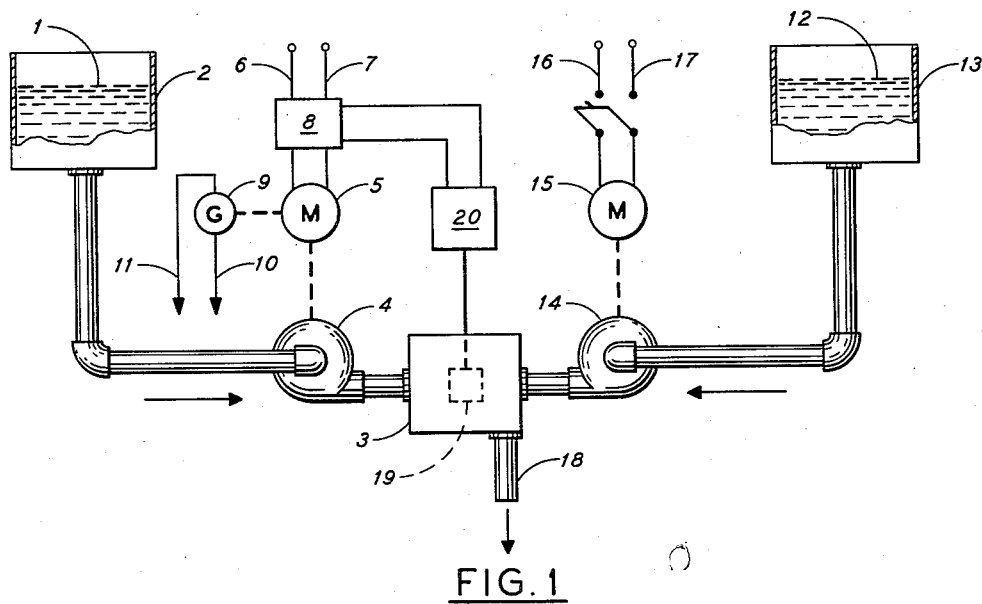
Fig. 1 is a diagrammatic representation of a generalized form of continuous titration system, including a detector system.

Referring now to Fig. 1, there shown is a representation of a generalized form of continuous titration system, including a detector system. Liquid hydrocarbons 1 are pumped from source 2 to mixing and titration zone 3 by pump 4, which is driven by coupled variable speed electric motor 5. Pump 4 is preferably a gear pump or other positive displacement device. Motor 5 may be, for example, a direct current motor energized from lines 6 and 7 and controlled by motor controller 8. From generator 9, which is coupled to motor 5, generator output lines 10 and 11 lead, for example, to conventional mechanism used to continuously translate the generator output signals to a continuous recording chart record of the variations in the speed of motor 5 and hence, of pump 4. Alternatively, the same result may be accomplished by coupling generator 9 to pump 4. Reagent liquid 12, which may be, for example, perchloric acid dissolved in glacial acetic acid, when the concentration of basic nitrogen in liquid hydrocarbons 1 is to be determined, is pumped from source 13 to mixing and titration zone 3 by pump 14, which is driven by coupled constant speed electric motor 15. Pump 14 is preferably a gear pump or other positive displacement device. Motor 15 may be, for example, a constant speed alternating current synchronous motor energized from lines 16 and 17. After having served its purpose, the mixture in zone 3 is carried off through exit line 18.

Still referring to Fig. 1, the speed of motor 5 may be varied by various means in order to vary the proportions of liquid hydrocarbons 1 and reagent liquid 12 in mixing and titration zone 3, so that at all times a given degree of neutralization of the basic nitrogen tends to be maintained in that zone. Preferably, said proportions are varied to maintain the mixture at the titration end point. Then the variations in speed of motor 5, as recorded in response to the output of generator 9, can be translated into a continuous indication of the concentration of basic nitrogen in liquid hydrocarbons 1. It will be seen that the same end results could be obtained by making 2 a source of liquid reagent 12, and by making 13 a source of liquid hydrocarbons 1, i. e., either could be pumped into titration and mixing zone 3 at a variable rate as required to maintain the given degree of neutralization.

Still referring to Fig. 1, some detecting means 19 is necessary to continuously detect deviations in the mixture in zone 3 from the degree of neutralization chosen as a basis, and further means is necessary to continuously vary the speed of motor 5 to restore the degree of neutralization to the chosen basis. As previously discussed, detecting means 19 could be an electrode system, in connection with which an amplifying system 20 could be used to amplify the electrode signal. The amplified signal could then be fed into motor controller 8 to accomplish the desired result. The disadvantages of such a detection system have been discussed previously, including the disadvantage that detecting means 19 is in contact with the liquid in zone 3. A high frequency detecting system would remove a detecting means 19 from such liquid contact, but would have other disadvantages previously discussed. A chromatically changeable indicator, for example, a visual indicator, in zone 3 would be desirable if means could be provided automatically to harness the chromatic changes of the indicator in zone 3 and translate the changes to speed control of motor 5, rather than relying upon manual control of motor 5 in response to human observation of color change in zone 3. This invention provides such automatic means.

Figure 2:
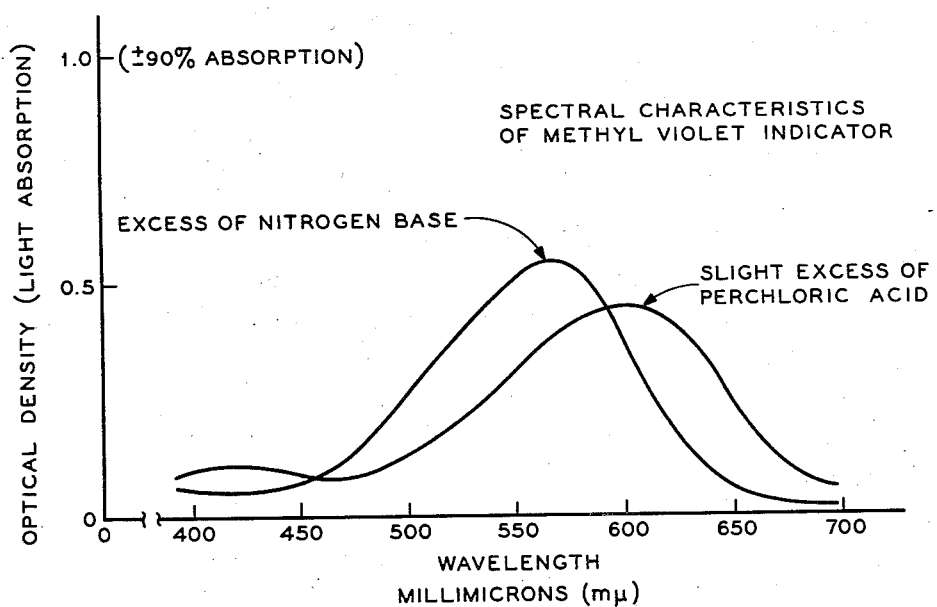
Fig. 2 is a graphical representation of the spectral characteristics of a particular chromatically changeable indicator, methyl violet.

Referring now to Fig. 2, there shown is a graphical representation of the spectral characteristics of a methyl violet indicator, in connection with which the present invention will be discussed, because it can readily be used as an indicator for the titration of basic nitrogen compounds with perchloric acid, the titration chosen to exemplify the invention. It will be appreciated that other indicators, for example, methyl blue, have applicability in connection with the present invention when used in connection with properly selected filters, tubes and other circuit elements. Such proper selection will be apparent to those skilled in the art after the invention is understood from the description contained herein. Methyl violet in the titration under discussion provides a sharp chromatic change at the equivalence point. The chemistry of the chromatic change is:

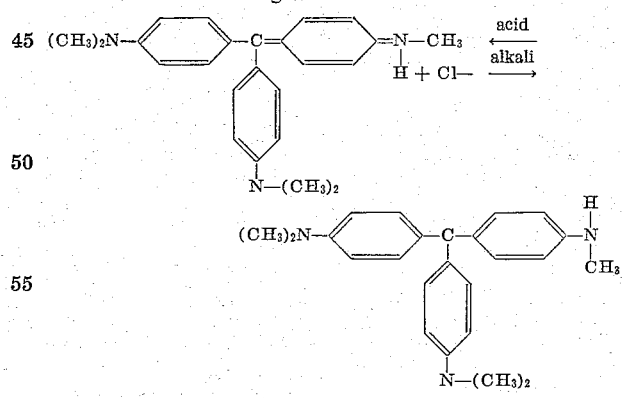

The spectral characteristics shown in Fig. 2 correspond to these chemical changes. From the figure it will be seen that when light is passed through methyl violet in a basic solution, the methyl violet will absorb more of the light impinging upon it in each of the wave lengths below about 600 millimicrons ($m\mu$) than it will absorb in the same wave length when the solution is acidic. It will also be seen that when the solution is acidic, the methyl violet will absorb more of the light impinging upon it in each of the wave lengths above about 600 $m\mu$ than it will absorb in the same wave length when the solution is basic. It will also be seen that when the solution is neutral or only very slightly acidic, the methyl violet will absorb about the same total amount of light in wave lengths above about 600 $m\mu$ as in wave lengths below about 600 $m\mu$, if the light absorbed in wave lengths below about 500 mµ is not considered. As will be shown later, by the use of a suitable filter these wave lengths below about 500 mµ may be filtered out in the present invention. The optical density on the vertical scale of Fig. 2 is a reciprocal function of the light transmission through methyl violet in solution, in accordance with the following relationship:

$$\text{Optical density} = \log_{10} \frac{1}{\text{light transmission}}$$

The present invention harnesses the changes in the relative amounts of light transmitted through a chromatically changeable indicator, for example, a methyl violet indicator, in two different wave length ranges, for example, about 500 to 600 mµ, and about 600 to 700 mµ, respectively, as changes occur in the degree of neutralization of a particular substance by a reagent, to actuate means for automatically and continuously correcting the proportions of liquid hydrocarbons and reagent in the titration zone as necessary to restore the original degree of neutralization, and therefore to restore the original relationship between the amounts of light transmitted in the said ranges. It will be appreciated that the methyl violet indicator and the 500–600 mµ and 600–700 mµ ranges discussed in connection therewith are exemplary only, that other indicators may be used in other titrations, and that other contiguous or non-contiguous wave length ranges may be used in which radiation incident upon the indicator used will be affected by the indicator in a similar manner.

Figure 3:
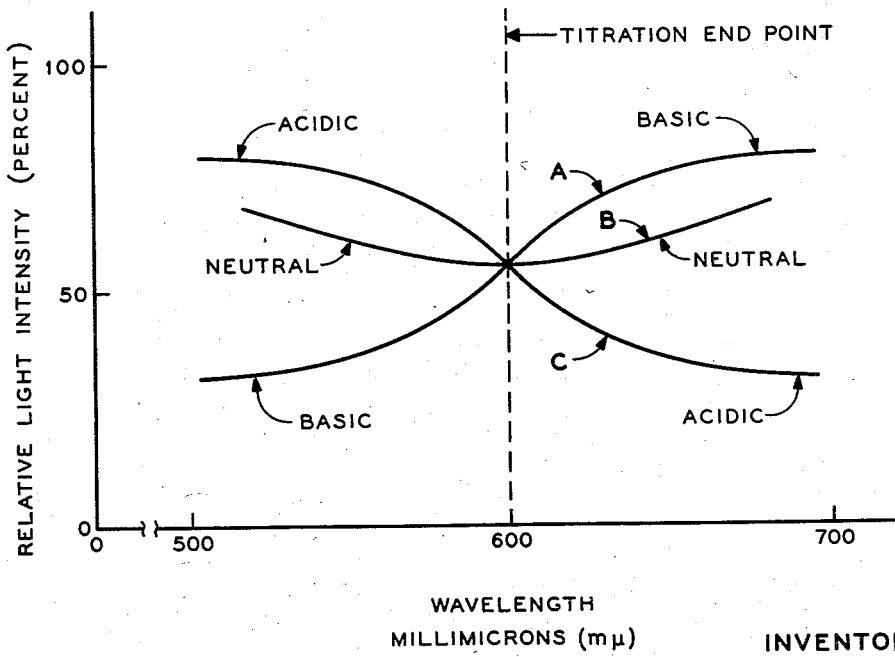
Fig. 3 is a graphical representation of the intensities of light in various wave lengths transmitted through a mixture of liquid hydrocarbons, a glacial acetic acid-perchloric acid titration reagent, and a methyl violet indicator, for a basic, a neutral, and an acidic condition of said mixture, and for one exemplary combination of concentrations of the various materials in the mixture.

Referring now to Fig. 3, there shown is an exemplary graphical representation, with the 500 mµ to 700 mµ wave length band discussed in connection with Fig. 2, of the relative intensity of light transmitted at various wave lengths through a titrate-reagent-indicator mixture of liquid hydrocarbons, glacial acetic acid-perchloric acid reagent, and methyl violet indicator, for basic neutral, and acidic conditions of the mixture. It will be seen from curve A in the figure that, when the mixture is basic, the chemical structure of the methyl violet indicator permits the mixture to transmit more of the light impinging upon the indicator in each of the wave lengths above about 600 mµ than in each of the wave lengths below about 600 mµ, in agreement with the absorption curves of Fig. 2. It will also be seen from curve C in the figure that, when the mixture is acidic, the mixture transmits more of the light impinging upon the indicator in each of the wave lengths below about 600 mµ than in each of the wave lengths above about 600 mµ. It will further be seen from curve B in the figure that when the mixture is in a neutral condition, the mixture transmits light in equal total intensities above and below about 600 mµ.

It will be understood that the curves shown in Fig. 3 are for an exemplary combination of concentrations of the various materials in the mixture only, and that many combinations of concentrations are possible. With a relatively low basic nitrogen content in the hydrocarbons, for example, 2 parts per million (p. p. m.), the reagent necessary to neutralize the basic nitrogen likewise will be present in the low concentration. With a relatively low concentration of methyl violet indicator, the mixture would transmit a higher light intensity in each of the wave lengths than with a higher methyl violet concentration, and the curves would be displaced upward in the figure.

The application of the above reactions and principles in the present invention will now be considered in connection with a specific embodiment of the invention, the general operation of which will first be described, followed by a detailed description which follows the operation through a complete cycle.

Figure 4:
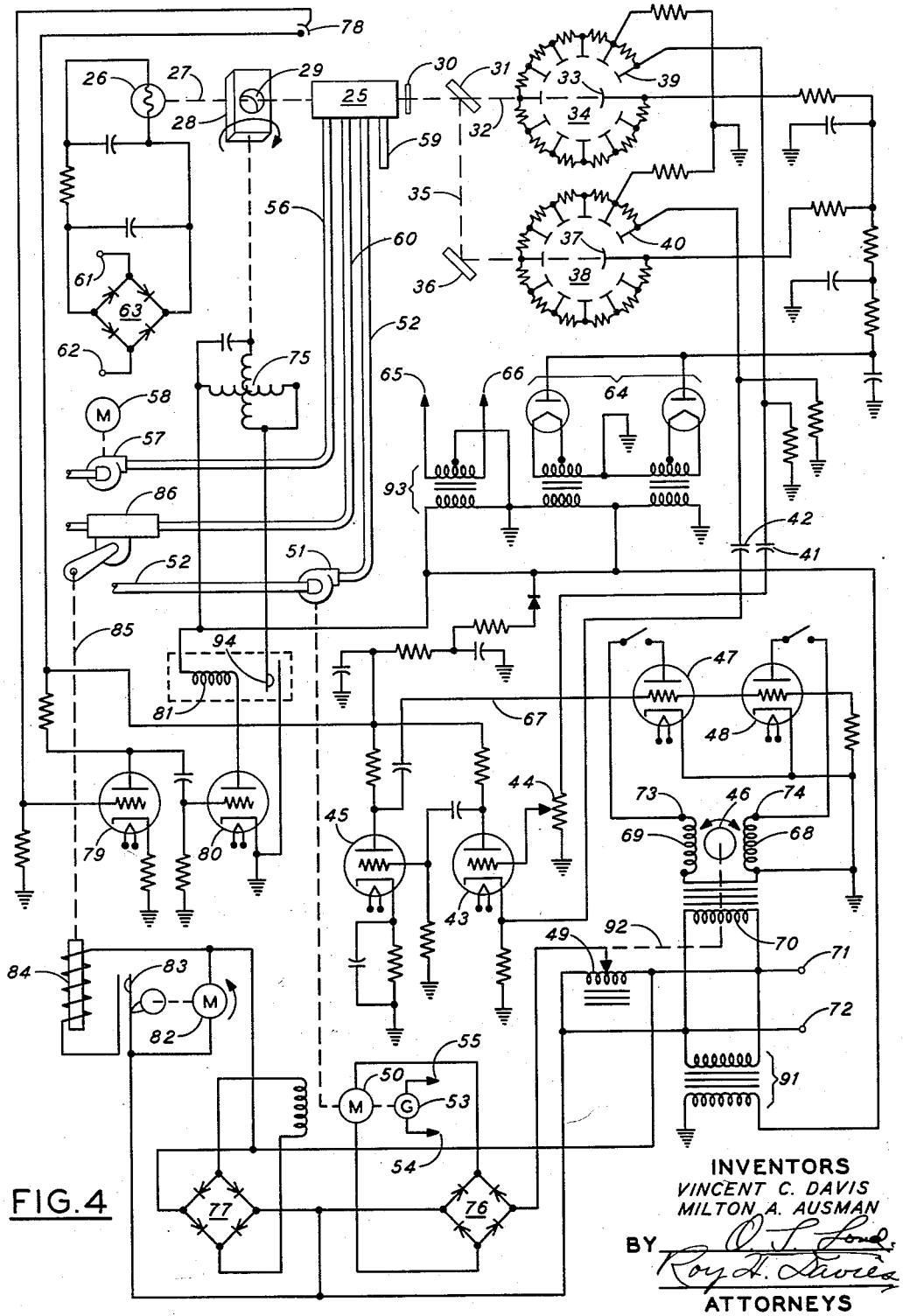
Fig. 4 is a diagrammatic representation of an embodiment of this invention, including a circuit diagram of the electrical components thereof.

Referring now to Fig. 4, there shown is a diagrammatic representation of an embodiment of the present invention, including a circuit diagram of the electrical components thereof. Sample cell 25 provides a mixing and titration zone for basic nitrogen-containing liquid hydrocarbons, a glacial acetic acid-perchloric acid reagent and a methyl violet indicator, and is equipped with windows at each end so that radiation, for example, light from lamp 26, may pass through the mixture in the cell. As hereinafter described, the hydrocarbons flow into cell 25 at a variable rate through line 52, while the reagent flows into cell 25 at a constant rate, although it will be apparent to those skilled in the art that the present invention may easily be adapted to a constant hydrocarbon flow with a variable reagent flow, provided that the indicator concentration in sample cell 25, if introduced in the reagent stream, does not drop to an inoperative level.

Still referring to Fig. 4, the general operation of the embodiment of the invention there shown is as follows: Light from lamp 26 passes along path 27 through rotating shutter 28, which rotates at 1800 R. P. M. and thus passes light through aperture 29 into and out of sample cell 25 at the rate of 60 square-waved pulses per second, each pulse separated by a period of no light passage when aperture 29 is not in alignment with path 27. From sample cell 25, light passes through filter 30, selected to filter out light of wave lengths below about 500 mµ, and thence to dichroic plate 31, selected to separate light into two components, one containing wave lengths predominantly above about 600 mµ and the other containing wave lengths predominantly below about 600 mµ. The component containing wave lengths above about 600 mµ passes through dichroic plate 31 along path 32 to cathode 33 of photomultiplier tube 34. The component containing wave lengths below about 600 mµ is reflected by dichroic plate 31 and passes along path 35 to plane mirror 36, which reflects it to cathode 37 of photo-multiplier tube 38. The output signals from anodes 39 and 40 of photomultiplier tubes 34 and 38, respectively, approximate square waves and have a frequency of sixty pulses per second. After passing through condensers 41 and 42, respectively, each signal is, with respect to ground, in effect a sixty-cycle-per-second square-wave alternating current. The signal from tube 34 is in phase with the signal from tube 38, until the two signals are fed into mixer and phase inverter tube 43. The signal from tube 34 is fed into the grid of tube 43, and the signal from tube 38 is fed into the cathode of tube 43, so that the phases of the two signals are reversed with respect to each other at the anode of tube 43. Assuming that the mixture in sample cell 25 is at the titration end point, then dichroic plate 31 may pass about equal amounts of light to cathodes 33 and 37 of photomultiplier tubes 34 and 38, respectively. In such case the signals applied to the grid and cathode, respectively, of tube 43 will be about equal in amplitude, except for possible slight variations in amplitude which may be partially caused, for example, by possible differences in the characteristics of photomultiplier tubes 34 and 38, and because of the conversion gain in the grid signal with respect to the cathode signal in tube 43. These amplitude variations are compensated for by voltage divider resistor 44, which may be, for example, a 100,000 ohm resistor. Voltage divider resistor 44 is adjusted until the grid and cathode signals applied to tube 43 cancel and no signal appears at the anode of tube 43. Then, with tube 43 not conducting an A. C. current, no signal is fed to the grid of amplifier tube 45, and, as will be shown, shaded pole motor 46 will not be rotated in either direction by motor drive tubes 47 and 48. As will further be shown, a deviation of the mixture in sample cell 25 from the end point will cause the relative amounts of light impinging upon the cathodes of photomultiplier tubes 34 and 38 to change, with the result that the relative amplitudes of the signals applied to the grid and cathode, respectively, of tube 43 will change, and, when thus no longer equal in amplitude, they will no longer cancel at the anode of tube 43.

Tube 43 will therefore conduct a current having one phase if the output of tube 34 increases with respect to that of tube 38, and the opposite phase if the output of tube 38 increases with respect to that of tube 34. It will be shown that the signal current thus conducted by tube 43 will be amplified by tube 45 and applied to the grids of motor drive tubes 47 and 48 to rotate motor 46 in one direction or the other, depending solely on the phase of the current being conducted by tube 43. Rotation of motor 46 will drive variable transformer 49, which will change the speed of direct current motor 50 and hence, coupled pump 51 which drives the hydrocarbon stream in line 52. It will be shown that the rate of flow of the hydrocarbon stream in line 52 will be so changed by the foregoing speed change of pump 51 that the deviation of the mixture in cell 25 from the end point will be corrected, and the end point restored, at which time the portions of the output signals from photomultiplier tubes 34 and 38 appearing at the anode of tube 43 will again be equal and motor 46 will again be stationary. Generator 53 is direct coupled to motor 50, and the output of generator 53 through lines 54 and 55 is utilized as desired for a continuous record of the variations in speed of motor 50, which record may be interpreted in terms of the basic nitrogen content of the hydrocarbon stream flowing in line 52.

Still referring to Fig. 4, a complete cycle of operation of the embodiment of the invention there shown, together with further details of various system and circuit elements, will now be described.

Figure 5:
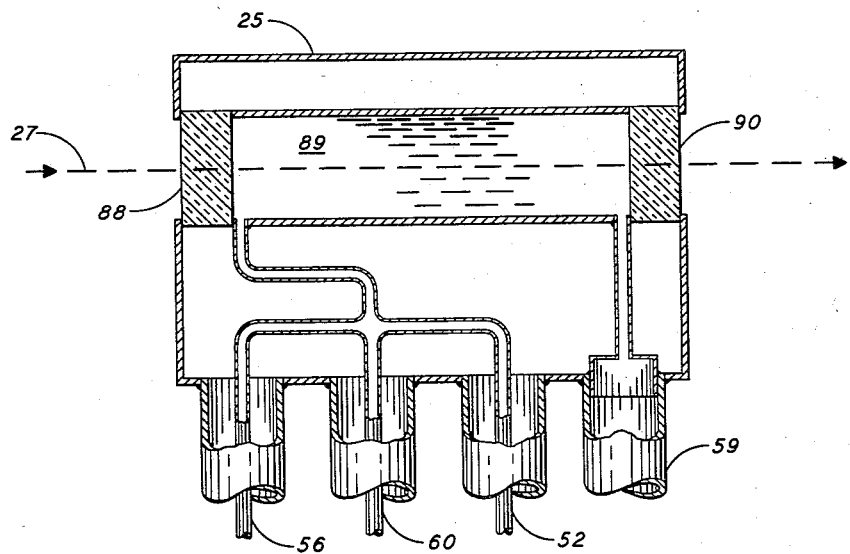
Fig. 5 is a modified sectional view of an embodiment of sample or titration cell for use with this invention.

Assuming first that the mixture in cell 25 is at, for example, the titration end point, the operation of the system is as follows:

Sample cell 25, which will be described in detail in connection with Fig. 5, is continuously supplied with a liquid reagent through line 56 by pump 57, which is driven by motor 58. In the exemplary titration under consideration, the liquid reagent may comprise glacial acetic acid and perchloric acid. Pumps 51 and 57 preferably are gear pumps or other positive-displacement devices to prevent stream leakage, constructed of suitably corrosion-resistant material. Motor 58 is preferably a constant-speed synchronous motor to drive the reagent stream at a constant rate, although as elsewhere pointed out, the principles of the present invention may be applied whether the reagent stream is driven at a constant rate and the titrate stream at a variable rate, or vice versa. Sample cell 25 is further supplied continuously with a titrate stream through line 52 by pump 51, which is driven by motor 50. In the exemplary titration under consideration the titrate stream may comprise liquid hydrocarbons containing small amounts of basic nitrogen. Motor 50 is preferably a direct current motor for ease in obtaining the speed control necessary to drive pump 51 at a variable speed when pump 57 is being driven at a constant speed. Line 59 is provided to drain surplus liquid from cell 25, and line 60 is provided for periodic purging of cell 25 with a purging liquid, as will be described hereinafter. A chromatically changeable titration indicator, for example, methyl violet in the titration under discussion, is continuously introduced into cell 25 at a rate sufficient to provide an adequate indicator concentration in cell 25 at all times. An exact indicator concentration is not critical to the present invention other than as it relates to the sensitivity of the invention, and those skilled in the art will be able to determine the concentrations necessary. The indicator may be so introduced, for example, by being supplied to cell 25 in the stream of liquid reagent flowing in line 56.

It will be appreciated that the quantities of liquids necessary for use with the present invention per day are quite small. For example, the hydrocarbon stream may readily be obtained by bleeding a minor amount from a main source. It has been found that quite satisfactory results have been obtained with about one gallon of reagent per day. It has been found most practical, because of the minor amounts of materials involved, to simply discard the materials leaving cell 25 through exit line 59.

Lamp 26 is supplied from A.-C. lines 61 and 62 through rectifier 63. Alternatively, lamp 26 could be supplied from a D. C. battery; however, the rectified A. C. power supply is preferable because of the bulkiness of a battery and the attention it requires. Suitable condensers and resistors are provided to reduce A. C. ripple from the filament of lamp 26 and maintain its input at a level consistent with satisfactory lamp life. The choice of a light source depends on the range of radiation in which operations are to be conducted. For operations with visual indicators having spectral characteristics lying within the range 300–1200 m$\mu$, a standard incandescent lamp will be found suitable.

Light from lamp 26 passes along path 27 through rotating shutter 28, which is caused by motor 75 to rotate at 1800 r. p. m. and thus "chops" the light beam from lamp 26 into 60 separate square-waved pulses per second. It will be understood that means other than shutter 28 may be used for pulsing the light beam from lamp 26. For example, in lieu of shutter 28 in light path 27, rotating shutters driven by motor 75 in each of light paths 32 and 35 may be used. As a further example, in lieu of any shutter arrangement, motor 75 may actuate means for turning light source 26 on and off as necessary to duplicate the light pulses produced by use of shutter 28. Those skilled in the art will appreciate that in lieu of means for passing the light beam from lamp 26 through cell 25 in a continuously straight path in order to have the mixture in cell 25 affect the wave lengths of the component parts of the light emerging from cell 25, means which will cause the direction of the light to change within cell 25 may be used. From sample cell 25, the spaced light pulses pass through filter 29, selected to filter out undesirable wave lengths, for example, those below about 500 m$\mu$ in the titration under consideration, and thence to dichroic plate 31. Dichroic plate 31 is selected to separate the light beam, emerging from cell 25 in the form of pulses, into two separate components, a beam comprising wave lengths lying within a first predetermined wave length band, and another beam comprising wave lengths lying within a second and separate predetermined wave length band. Dichroic plate 31 is so arranged that one of the two resulting beams impinges upon cathode 33 of photomultiplier tube 34 and the other resulting beam impinges upon cathode 37 of photomultiplier tube 38. It will be understood that other means than a fixed dichroic plate, for example, systems of prisms, ruled gratings, absorption filters, or rotating dichroic plates may be used for separating the light beam emerging from cell 25 into the desired components.

As used herein, the term "dichroic plate" refers to those devices, known in the art as beam-splitters or filters, having the ability to transmit a portion of the incident light and to reflect another portion. Such devices may be obtained which have little or no light absorption, thus permitting use of practically all of the incident light.

Photomultiplier tubes 34 and 38 may be similar tubes, each with the same response characteristics. For example, for the titration under consideration, tubes with either an S–1 or an S–9 response will be satisfactory. Photomultiplier tubes are stable, have long operating life, are relatively free from fatigue effects and are quite durable. Hence, they contribute to the ruggedness of the apparatus of the present invention. Voltage divider resistor 44 is provided to balance the signals from tubes 34 and 38, as hereinafter described. It is not critical to the present invention that the amounts of light impinging upon the cathodes of photomultiplier tubes 34 and 38 be equal, and any unbalance in the output signals caused by an unbalance in the impinging light or for other reasons, is compensated for by resistor 44. Phototubes 34 and 38 are operated from high voltage full wave rectifier 64, so connected that the tubes 34 and 38 operate with negative voltages. Rectifier 64 may be so selected and connected that anodes 39 and 40 of phototubes 34 and 38 are maintained at about ground potential, and cathodes 33 and 37 operate at about —900 v. In this manner the danger involved in operating the apparatus with a high positive voltage level at the anodes of the phototubes is eliminated.

The various tube filaments in the embodiment shown may be supplied from lines 65 and 66 leading from filament transformer 93.

The output signals from phototubes 34 and 38, respectively, will be square-waved and will have a frequency of 60 pulses per second, in response to the light pulses impinging upon cathodes 33 and 37. Since, in accordance with the assumption that the titration in cell 25 is at the end point, and therefore that the methyl violet indicator in cell 25 will pass about equal amounts of light above and below about 600 m$\mu$, the total intensity of light impinging upon each of phototubes 34 and 38 is about equal. Therefore, the signals from anodes 39 and 40 will be approximately equal in amplitude, and will have the same phase because each tube sees the same on-off light source. The output signal of one of the two phototubes, for example, the signal from anode 39 of phototube 34, is fed into the grid of mixer and phase inverter tube 43, as shown. The output signal of the other phototube is fed into the cathode of tube 43, as shown. Condensers 41 and 42 are provided to translate the horizontal axis of these square-waved signals so that each is in effect a square-waved sixty-cycle-per-second alternating current. It will be seen that the effect of feeding one of these two signals into the grid and the other into the cathode of tube 43 effects a phase reversal of one of these two signals with respect to the other at the anode of tube 43, so that with respect to that anode one signal is negative when the other is positive, and vice versa. These two signals are approximately equal in amplitude, except for possible variations in amplitude mainly caused by possible differences in the characteristics of photomultiplier tubes 34 and 38, and the amplification of tube 43. These variations are compensated for by voltage divider resistor 44, which is adjusted until the grid and cathode signals applied to tube 43 cancel and no signal appears at the anode of tube 43. Therefore, amplifier tube 45 has no signal to amplify and feed to motor drive tubes 47 and 48 of shaded pole motor 46, which therefore does not turn and does not drive variable transformer 49 to change the speed of motor 50, which drives pump 51 in liquid hydrocarbon line 52.

Now it will be assumed that the basic nitrogen content of the hydrocarbon stream in line 52 increases. The titration in cell 25 will therefore go to the basic side, and thus cause a chromatic change in the methyl violet indicator in cell 25. From the spectral response and transmission curves previously discussed, it will be seen that the total intensity of light passed by dichroic plate 31 to cathode 33 of phototube 34 in the wave length band above about 600 m$\mu$ will have increased and the total intensity of light reflected from plane mirror 36 to cathode 37 of phototube 38 will have decreased. The output signal from anode 39 of 600–700 m$\mu$ phototube 34 therefore will have increased in amplitude and the output signal from anode 40 of 500–600 m$\mu$ phototube 38 will have decreased, although both still are equal in phase, because each tube receives its input signal from the same pulsating light source. Therefore, the signals from phototubes 34 and 38 will no longer cancel at the anode of tube 43 because no longer are they equal in amplitude. Because the phase of the signal from phototube 34 is reversed by tube 43 with respect to the signal reaching tube 43 from phototube 38, a signal will appear at the anode of tube 43 having the phase of the signal from phototube 34, and also having the same square-waved shape and sixty-cycle-per-second frequency. This signal is now amplified by resistance coupled amplifier tube 45 and is fed through line 67 to the grids of motor drive tubes 47 and 48 that control shaded pole motor 46. Shading coils 68 and 69 of shaded pole motor 46 are energized by having a voltage induced in them from primary 70, which is energized from a 115 volt A. C. source through lines 71 and 72. Shading coils 68 and 69 are so arranged that end 73 of shading coil 69 is out of phase with end 74 of shading coil 68, i. e., the voltages induced in shading coils 68 and 69 are out of phase. These shading coil ends are connected to the anodes of motor drive tubes 47 and 48, respectively. The currents induced in these shading coils will have the same frequency as the frequency of the chopped light pulses reaching phototubes 34 and 38, because shutter drive motor 75 is selected so that the light pulse frequency will equal the frequency of the A. C. source at lines 71 and 72, which is sixty cycles per second in the embodiment under discussion. Therefore, the grid signal voltages and anode voltage frequencies of motor drive tubes 47 and 48 will be equal. However, the signal on the grids of these tubes will be in phase with the signal of the anode of either tube 47 or tube 48, and out of phase with the other anode, depending upon the direction of the relative change in amplitude of the output signals from phototube 34 and phototube 38, i. e., depending upon whether the titration in cell 25 has deviated to the acid or basic side. As has been shown, the phase of one of these signals that has increased in amplitude with respect to the other appears at the anode of tube 43. Shaded pole motor 46 will turn in a direction depending upon whether shading coil 68 or shading coil 69 is conducting the greater current. Motor 46 will then drive variable transformer 49 through mechanical connection 92, which will change the voltage applied to armature rectifier 76 of D. C. motor 50, which drives pump 51 in line 52. Rectifier 77 is provided to energize the field of motor 50. If cell 25 is on the basic side of the titration, motor 50 will slow down, and thus cause the rate of flow of the hydrocarbon stream in line 52 to decrease, thereby increasing the acidity of the mixture in cell 25 and causing the indicator in cell 25 to return in chromatic structure toward its structure at the end point. If the titration in cell 25 deviates to the acid side, the reverse will occur. Generator 53, coupled to motor 50, provides a means for continuously recording the speed changes of motor 50. The output of generator 53, through lines 54 and 55, may be connected if desired to an inked record on a recording chart, and the record may be translated in terms of concentration of basic nitrogen in the hydrocarbon stream in line 52. It has been found that the embodiment described operates very satisfactorily to determine the basic nitrogen content of a hydrocarbon stream to an accuracy of about 2 p. p. m. at certain basic nitrogen concentrations. If desired, the output of generator 53 may be utilized to actuate conventional electro-mechanical means to stop the flow of liquid hydrocarbons in the main stream from which the titrate stream is taken, when said output rises to a predetermined value. If desired, said output may be used to actuate an alarm system.

Motor 75 is an alternating current four-pole synchronous motor, which may be energized through constant voltage transformer 91, as shown. It will be seen from the foregoing description of the operation of the embodiment shown that the phase of the light pulses produced by shutter or "chopper" 38 must be fixed with respect to the phase of the voltages in shading coils 68 and 69. However, synchronous motor 75, by its nature, could lock in at any 90° position, and therefore could lock in at an undesired point such that the light pulses reaching phototubes 34 and 38 would not be in the proper phase with respect to the voltages in shading coils 68 and 69. In such case the speed changes of motor 50 would be in the wrong direction to compensate for the deviation from the titration end point in cell 25, and the deviatioin would be aggravated rather than corrected. In order to prevent such an occurrence, phototube 78 is provided to receive light impulses emanating from shutter 28. The signal from phototube 78 is applied to the grid of amplifier tube 79, the anode of which is supplied with sixty-cycle current. Then, if the signal voltage on the grid of motor-synchronizing tube 80 is in phase with the anode voltage, it will be the wrong phase, so tube 80 will pass current, energize relay coil 81 to open contacts 94, and motor 75 will slow down until it is again in the proper phase, at which time phototube 78 will cause an out-of-phase signal to be applied to the grid of tube 79, which will prevent further conducting of current by tube 79.

If desired, a motor, for example, 1/15 R. P. M. alternating current motor 82 may be provided as shown to operate contactor 83 periodically and thereby energize means, for example, a solenoid coil 84 actuating a mechanical linkage 85, for opening valve 86 in line 60 leading to cell 25. Line 60 may be connected to a source of liquid purging material, for example, acetone, under sufficient pressure to purge and cleanse cell 25. This purging is preferably accomplished once about every fifteen minutes, as it will be done when motor 82 rotates at 1/15 R. P. M.

It will be understood from the foregoing that satisfactory records may be obtained of the basic nitrogen content of the hydrocarbon stream in line 52 even though the operating conditions at times may result in a tendency for the system to "hunt" about the end point, or other selected base point, of the titration.

Those skilled in the art will appreciate that, although in the embodiment described, the reagent could be pumped at a variable rate and the hydrocarbon stream at a constant rate, in such case the visual indicator preferably would not be added in the reagent stream. If it were, and the basic nitrogen content of the hydrocarbon stream went to a very low value, the reagent flow rate and hence, rate of addition of indicator, would also drop to a low value. If the concentration of indicator in the cell thus dropped to nearly zero, the embodiment might not operate properly.

It will also be understood from the foregoing that the absolute amplitudes of the signals emanating from phototubes 34 and 38 are not critical to the operation of the present invention, nor is any particular signal light wave length. The system is caused to operate to change the proportions of the mixture in cell 25 whenever the difference in intensity of the signals emanating from phototubes 34 and 38 produces a signal at the anode of tube 43, and it is the phase of the signal thus produced, and not the amplitude, that is determinative of the direction in which motor 46 will rotate to produce corrective action.

Those skilled in the art will understand that various filters, shutters, and other elements in the embodiment described in detail above may be relocated with respect to each other in various ways without departing from the spirit of the invention. Those skilled in the art will also appreciate that an embodiment of this invention may be constructed to operate as a direct current apparatus by eliminating the rotating shutter and various phase sensitive elements. In such a direct current modification, a non-pulsating beam from lamp 26 may be passed through or reflected from the mixture in cell 25, and then be broken up into two separate non-pulsating beams of two different wave length bands, one of which is passed into phototube 34 and the other of which is passed into phototube 38. The difference in signal strength of the resulting nonpulsating outputs from the two phototubes as the titration deviates from the end point or other selected base point may then be harnessed to vary the liquid proportions in cell 25 to tend to restore those proportions to the base point conditions.

Referring now to Fig. 5, there shown is a modified sectional view of an embodiment of a sample cell that may be used with this invention. Light or other radiation passes along path 27 through transparent window 88, chamber 89, and transparent window 90. Transparent windows 89 and 90 are preferably made of clear colorless glass. Reagent line 56, purge liquid line 87 and titrate line 52 preferably are in the form of capillary tubes as shown, with suitable protective coverings along their lengths. The purpose of the capillary tubes is at least twofold: to prevent back flow and leaching out of the acetone from the acetone line by the cell contents when the acetone is not flowing, and to reduce the time necessary to indicate a change in the basic nitrogen content of the hydrocarbon stream. If desired, mixing means may be provided in or in connection with cell 25 to maintain turbulence of the liquids in cell 25; otherwise, variations in their densities may prevent efficient mixing. One satisfactory means of accomplishing such a result is to provide in the outlet line 59 from cell 25 a diaphragm so arranged that it will pass the outlet stream and so that it may be actuated or "pulsed" periodically, for example, by a motor. The pulsing of the diaphragm transmits a pressure wave back through the outlet fluid stream in line 59 to cell 25, thus creating the necessary turbulence. It has been found that satisfactory operation is obtained by pulsing such a diaphragm about three times per second.

From the foregoing it may be seen that the present invention operates in a highly novel and effective manner to perform a continuous titration operation and obtain a continuing indication of the concentration of a given substance in a titrate liquid, by utilizing changes in relative intensity of light or other radiation transmitted by a chromatically changeable indicator in two different wave length bands, as the titration deviates from the end point, or other selected base point, to cause an alternating current signal, which is then amplified and used to actuate means for restoring the selected base point.

Although only specific arrangements and modes of construction and operation of the present invention have been described and illustrated, numerous changes could be made in those arrangements and modes without departing from the spirit of the invention, and all such changes that fall within the scope of the appended claims are intended to be embraced thereby.

We claim:

1. In automatic titration apparatus utilizing an indicator in a titration zone, means for passing radiation into said zone and for passing out of said zone the components of said radiation not absorbed by the contents of said zone, beam-splitting plate means for dividing said unabsorbed components into a first beam containing radiation having wave lengths lying with a first predetermined wave length band, and into a second beam containing radiation having wave lengths lying within a different predetermined wave length band, means responsive to changes in relative intensity between said first and second beams caused by changes in the structure of said indicator for producing an alternating current signal, and means responsive to the phase of said signal for varying the proportions of the titrate liquid and liquid reagent in said titration zone.

2. In automatic continuous titration apparatus utilizing an indicator in a single titration zone, means for passing a single beam of radiation in one wavelength band into the mixture in said zone and for passing out of the mixture in said zone, the components of said radiation not absorbed by the contents of said zone, beam-splitting plate means for dividing said radiation components emerging from said zone into a first beam containing radiation in a first wavelength band and a second beam containing radiation in a different wavelength band, said first beam having a greater intensity relative to the intensity of said second beam when the titration has deviated in one direction from the end point thereof and having a lesser intensity relative to the intensity of said second beam when said titration has deviated in the other direction from the end point thereof, and means responsive to the difference in total intensities between said first and second beams to return said titration to said end point.

3. Automatic titration apparatus comprising means for continuously supplying to a single titration zone a titrate stream, a reagent stream and an indicator changeable in chemical structure as the titration mixture in said zone deviates from a preselected degree of neutralization, means for passing a single beam of radiation in one wavelength band into and out of said mixture, means for dividing the radiation emerging from said mixture into the two separate and continuous wave length bands that contain about equal total intensities of radiation when said mixture is at said preselected degree of neutralization, and means for utilizing the changes in relative intensities of radiation in said wave length bands that occur in response to the differences in said chemical structure that take place as said mixture deviates from said preselected degree of neutralization to return said mixture to said preselected degree of neutralization.

4. Automatic continuous titration apparatus comprising means for continuously supplying to a single titration zone a titrate stream, a reagent stream and a chromatically changeable indicator, means for passing a single light beam in a single preselected wave length band through said titration zone and the contents thereof, means for dividing the components of said beam of light emerging from said titration zone into a second beam of light containing components of said first beam that emerge from said titration zone having wave lengths below about a predetermined wave length, and into a third beam of light containing components of said first beam that emerge from said titration zone having wave lengths above about said predetermined wave length, and means responsive to changes in relative intensity between said second and third light beams as said titration deviates from the end point thereof to vary the flow rate of one of said streams to return said titration to said end point.

5. Apparatus for performing a continuous titration comprising a single titration zone, means for supplying to said titration zone a titrate liquid to be analyzed, a liquid titration reagent and a chromatically changeable titration indicator, means for passing a single first beam of light in a single wavelength band through said titration zone and the contents thereof, means for dividing said beam of light emerging from said titration zone into a second beam of light containing substantially all components of said first beam that emerge from said titration zone having wave lengths below about the wave length in which the lowest intensity of light is passed at the end point of said titration, and into a third beam of light containing substantially all components of said first beam that emerge from said titration zone having wave lengths above about the wave length in which the lowest intensity of light is passed at the end point of said titration, and means responsive to differences in total intensity between said second and third light beams as said titration deviates from the end point thereof to vary the proportions of said titrate liquid and said liquid reagent in said titration zone to return said titration to said end point.

6. Continuous titration apparatus comprising a titration sample cell having windows for the passage of light through said cell and its contents, means for supplying to said cell a titrate liquid to be analyzed, a liquid titration reagent, and a chromatically changeable titration indicator, a light source arranged to pass a beam of light through said cell and its contents, a dichroic plate for dividing said beam of light emerging from said cell into a second beam of light containing all components of said first light beam that emerge from said cell having wave lengths below about the wave length in which the lowest intensity of light is passed at the end point of said titration, and into a third beam of light containing all components of said first light beam that emerge from said cell having wave lengths above about the wave length in which the lowest intensity of light is passed at the end point of said titration, a first photomultiplier tube having a cathode located in one of said second and third light beams, a second photomultiplier tube having a cathode located in the other of said second and third light beams, moving shutter means for causing said second and third light beams to reach said photomultiplier tubes in spaced light pulses, capacitor means in the output circuits of said photomultiplier tubes for causing the output current from each of said photomultiplier tubes to have an alternating form, means for applying said alternating current from one of said photomultiplier tubes to a grid of a vacuum tube, means for applying said alternating current from the other of said photomultiplier tubes to the cathode of said vacuum tube, means for amplifying the signal appearing at the anode of said vacuum tube as said titration deviates from the end point thereof, and means responsive to the phase of said amplified signal to vary the flow of a liquid stream flowing to said cell to vary the proportions of said titrate liquid and said liquid reagent in said cell to return said titration to said end point.

7. Analytical apparatus comprising a sample cell, means for continuously supplying to said cell a titrate stream, a reagent stream and an indicator changeable in chemical structure as the mixture in said cell deviates from a preselected degree of neutralization, means for passing radiation into and out of said mixture, beam-splitting plate means for separating into two different wavelength bands the radiation emerging from said cell, means responsive to the change in relative intensity of the radiation transmitted by said indicator in said two bands as the titration deviates from said degree of neutralization for producing an alternating current signal, and means responsive to the phase of said signal for restoring said degree of neutralization in said cell.

8. Analytical apparatus comprising a titration cell containing titrate, titration reagent and a titration indicator changeable in chemical structure as the mixture in said cell deviates from a preselected degree of neutralization, means for passing radiation into and out of said cell in a pulsed beam, means for separating said pulsed beam emerging from said cell into two pulsed beams containing radiation in different wavelength bands, means responsive to the total intensity of radiation in one of said two pulsed beams for producing an alternating current signal, means responsive to the total intensity of radiation in the other of said two pulsed beams for producing a second alternating current signal, means responsive to changes in the difference in strength between said signals, as deviations from said degree of neutralization cause differences in the relative intensity of radiation transmitted by said indicator in said two pulsed bands, for restoring said degree of neutralization in said cell.

9. In analytical apparatus comprising a sample cell for material to be analyzed, means for passing radiation into and out of said cell, means for dividing said radiation emerging from said cell into two separate beams having characteristics changeable in response to changes in said material, means responsive to changes in the characteristics of one of said two beams for varying a first electrical signal, means responsive to changes in the characteristics of the other of said two beams for varying a second electrical signal, the improvement which comprises means for pulsing said two beams to cause said electrical signals to be pulsed, means for converting said pulsed signals to alternating current signals, and means responsive to relative changes in said alternating current signals caused by changes in said material for providing an indication of said changes in said characteristics.

10. The method of analyzing a sample stream to determine continuously changes in chemical composition of said stream, which comprises continuously passing said stream through a single sample cell, passing a single beam of radiation in a single wavelength band into and out of said cell and the contents thereof, dividing with a radiation-splitting plate the radiation emerging from said cell into a first beam containing radiation in a first predetermined wavelength band and into a second beam containing radiation in a different predetermined wavelength band, and utilizing changes in relative intensity of radiation in said first and second beams caused by changes in the chemical composition of said stream as a measure of said changes in chemical composition.

11. The method of analyzing a sample stream to determine continuously changes in chemical composition of said stream, which comprises continuously passing said stream through a sample cell, passing radiation in a preselected wavelength band into and out of the contents of said cell, dividing with a radiation-splitting plate the radiation emerging from said cell into a first beam containing radiation in a first predetermined wavelength band and into a second beam containing radiation in a different predetermined wavelength band, all of said wavelength bands being so selected that said changes in chemical composition of said stream will cause changes in relative total intensity between said first and second beams, producing an alternating current signal having one phase when said first beam has a greater total intensity than said second beam and having a different phase when said second beam has a greater total intensity than said first beam, and utilizing changes in the phase of said signal as an indication of said changes in chemical composition.

References Cited in the file of this patent

UNITED STATES PATENTS

| | | |
|---|---|---|
| 1,960,615 | Baker | May 24, 1934 |
| 2,063,140 | Allison | Dec. 8, 1936 |
| 2,737,591 | Wright et al. | Mar. 6, 1956 |
| 2,761,067 | Troy | Aug. 28, 1956 |
| 2,768,370 | Maninger | Oct. 23, 1956 |